(12) United States Patent
Huang

(10) Patent No.: US 8,173,893 B2
(45) Date of Patent: May 8, 2012

(54) ELECTRONIC DEVICE CASE

(76) Inventor: Yao-Hung Huang, Tainan Hsien (TW)

( * ) Notice: Subject to any disclaimer, the term of this patent is extended or adjusted under 35 U.S.C. 154(b) by 0 days.

(21) Appl. No.: 12/802,045

(22) Filed: May 28, 2010

(65) Prior Publication Data
US 2011/0290686 A1    Dec. 1, 2011

(51) Int. Cl.
*H01L 31/042* (2006.01)
*B65D 85/00* (2006.01)

(52) U.S. Cl. .................... 136/251; 320/101; 361/679.08; 361/679.02; 206/320; 206/45.24; 206/45.2

(58) Field of Classification Search .................. 206/320, 206/305, 45.23, 45.24, 45.26, 764, 45.2; 361/679.02, 679.03, 679.08, 679.09, 679.1, 361/679.11, 679.12, 679.13, 679.14, 679.15, 361/679.16, 679.17; 136/251, 243, 244; 320/101, 114
See application file for complete search history.

(56) References Cited

U.S. PATENT DOCUMENTS

| | | | | | |
|---|---|---|---|---|---|
| 2,325,273 | A | * | 7/1943 | Pung | 40/352 |
| 2,444,369 | A | * | 6/1948 | Rentos | 248/450 |
| 2,515,887 | A | * | 7/1950 | Moore | 206/45.26 |
| 4,386,642 | A | * | 6/1983 | Durbin | 190/110 |
| 4,837,590 | A | * | 6/1989 | Sprague | 346/145 |
| 5,177,665 | A | * | 1/1993 | Frank et al. | 361/679.43 |
| 5,475,626 | A | * | 12/1995 | Viletto | 361/679.55 |
| D369,677 | S | * | 5/1996 | Bussmann et al. | D3/282 |
| 5,522,943 | A | * | 6/1996 | Spencer et al. | 136/245 |
| 5,552,957 | A | * | 9/1996 | Brown et al. | 361/679.41 |
| 5,590,022 | A | * | 12/1996 | Harvey | 361/679.41 |
| 5,682,993 | A | * | 11/1997 | Song | 206/320 |
| 5,724,225 | A | * | 3/1998 | Hrusoff et al. | 361/679.55 |
| 5,812,369 | A | * | 9/1998 | Hsu et al. | 361/679.6 |
| 5,857,568 | A | * | 1/1999 | Speirs | 206/320 |
| D414,751 | S | * | 10/1999 | Yogalingam | D14/335 |
| 6,134,105 | A | * | 10/2000 | Lueker | 361/679.41 |
| 6,321,912 | B1 | * | 11/2001 | Lippert et al. | 206/576 |
| 6,371,288 | B1 | * | 4/2002 | Licata | 206/214 |
| 6,421,235 | B2 | * | 7/2002 | Ditzik | 361/679.3 |
| 6,571,948 | B2 | * | 6/2003 | Jones | 206/320 |
| 6,637,594 | B1 | * | 10/2003 | Bucknell | 206/425 |
| 6,870,089 | B1 | * | 3/2005 | Gray | 136/251 |
| 6,981,593 | B1 | * | 1/2006 | Klodt | 206/541 |

(Continued)

FOREIGN PATENT DOCUMENTS
DE    10307026 A1 *  9/2004
(Continued)

*Primary Examiner* — David Fidei
(74) *Attorney, Agent, or Firm* — Alberta O. Cota

(57) ABSTRACT

An electronic device case (10) for storing and protecting a portable electronic device (108). The case (10) has two design configurations. The first configuration comprises a device cover (12) with a first section (14) and a second section (30). The two sections (12,14) interface at a living hinge (46). The electronic device (108) is placed within the first section (14), which can be folded onto the second section (30) during travel or storage. The second configuration comprises a single, unitary device cover (70) into which the electronic device (108) is placed. Both configurations include a keyboard (110) that is located within a keyboard cavity (52 or 88), a first pocket (54 or 90) that holds a USB cable (112) for interfacing the keyboard to the electronic device, and a second pocket (56 or 92) that holds a power cable (114) for supplying power to the electronic device. Additionally, both configurations have at least one photovoltaic cell (60 or 98) that absorbs solar power which is then converted into a DC voltage for powering the electronic device (108).

4 Claims, 5 Drawing Sheets

U.S. PATENT DOCUMENTS

| | | | |
|---|---|---|---|
| 7,191,926 B1* | 3/2007 | Costantino et al. | 224/605 |
| D581,151 S | 11/2008 | Aipa | |
| 7,612,997 B1 | 11/2009 | Diebel et al. | |
| 7,628,271 B1* | 12/2009 | Marton | 206/320 |
| 7,652,452 B2* | 1/2010 | Mori et al. | 320/107 |
| D611,703 S | 3/2010 | Fahrendorff et al. | |
| 7,673,745 B2 | 3/2010 | Sirichai et al. | |
| 7,907,400 B2* | 3/2011 | Bekele | 361/679.55 |
| 7,909,161 B2* | 3/2011 | Sween et al. | 206/320 |
| 2002/0000390 A1* | 1/2002 | Hollingsworth | 206/320 |
| 2003/0000857 A1* | 1/2003 | Jones | 206/320 |
| 2005/0140331 A1* | 6/2005 | McQuade | 320/101 |
| 2006/0226040 A1* | 10/2006 | Medina | 206/320 |
| 2006/0226045 A1* | 10/2006 | Murphy | 206/576 |
| 2007/0222410 A1* | 9/2007 | Lee | 320/101 |
| 2010/0044259 A1* | 2/2010 | Wang | 206/320 |
| 2010/0198582 A1* | 8/2010 | Johnson | 704/8 |
| 2010/0294683 A1* | 11/2010 | Mish et al. | 206/320 |
| 2010/0300909 A1* | 12/2010 | Hung | 206/320 |
| 2011/0011759 A1* | 1/2011 | Luo | 206/320 |
| 2011/0204843 A1* | 8/2011 | Foster | 320/101 |

FOREIGN PATENT DOCUMENTS

FR    BE 1017319 A6 *   6/2008

* cited by examiner

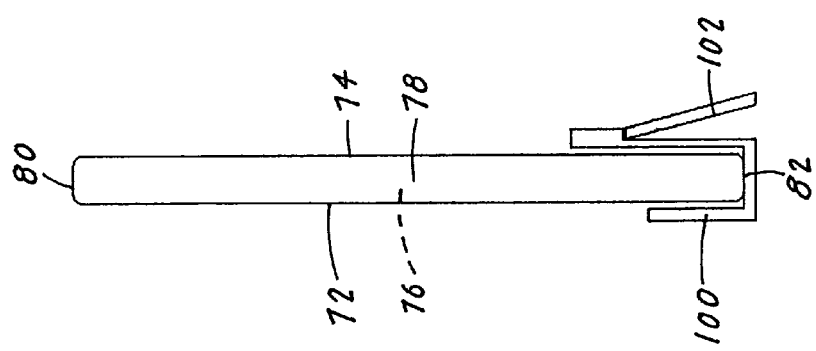

ELECTRONIC DEVICE CASE

TECHNICAL FIELD

The invention generally pertains to cases for electronic devices, and more particularly to an electronic device case for storing, protecting and powering a portable device such as a laptop PC, a tablet PC or an e-book.

BACKGROUND ART

Portable electronic devices (PEDs) such as laptop computers, tablet computers and e-books have become increasingly popular. The functionality of these devices coupled with the ability to easily transport and use them has contributed to their popularity. Most PEDs share a typical design philosophy, which results in a lightweight device with an attractive appearance.

PEDs are usually made of a strong, lightweight metal and most have a relatively large, when compared to their overall size, screen. Although PEDs are designed to be transportable, it is a well-known fact that they can be easily damaged both internally and externally. It is therefore recommended that users of PEDs take appropriate measures to insure the devices are not misused or put in potentially damaging positions.

In order to assist in protecting the appearance/outer case of a PED there are a large number of cases available. Some of the cases are designed to have a generic fit to accommodate a variety of PEDs, while others are designed to cover one particular model and/or brand of PED. The ability of a specific case to adequately provide the required protection depends on how well the case is made and the strength of the materials used to make the case.

Some case manufacturers attempt to add to the functionality of the cases by adding additional features to the cases. The features range from simply adding pockets for storing accessories, providing extended battery power and other device specific improvements.

Even though there are a large number and variety of cases with additional features or benefits, there is still a need for improvement. A case that would provide the necessary protection against external damage as well as include the benefit of a built-in keyboard and power supply storage would be beneficial. Many current PEDs especially table computers and e-books do not have physical keyboards. Many people prefer a physical keyboard to the touch-screen keyboards that are typically utilized. By providing a physical keyboard that is integrated with a case, along with the ability to capture, store and provide additional power such as solar power, the functionality of a PED case would be significantly improved.

For background purposes and as indicative of the art to which the invention relates, reference may be made to the following patents found in the search:

| U.S. Pat. No. | INVENTOR | ISSUED |
|---|---|---|
| D611,703 | Fahrendorff et al | Mar. 16, 2010 |
| 7,673,745 | Sirichal et al | Mar. 09, 2010 |
| 7,612,997 | Diebel et al | Nov. 03, 2009 |
| D581,157 | Aipa | Nov. 25, 2008 |

DISCLOSURE OF THE INVENTION

There are two design configurations of the electronic device case, with both configurations functioning to store and protect a portable electronic device such as a tablet PC or e-book. Both configurations comprise a device cover: the first configuration's cover has a first section and a second section, which are attached together at a living hinge that allows the first section, with the electronic device located therein, to be folded onto the second section. The second configuration has a single, unitary cover into which the electronic device is placed.

Both configurations have a keyboard that is located within a keyboard cavity, a first pocket that holds a USB cable for interfacing the keyboard to the electronic device, and a second pocket that holds a power cable for supplying power to the electronic device. Since each of the two cables are removable from their respective pocket, either pocket can be used to hold either cable. Also, the pockets can be used to hold other items such as writing utensils, telephones, or other items.

Additionally, both configurations have at least one photovoltaic cell that absorbs solar power which is converted into a DC voltage for powering the electronic device. The auxiliary power provided by the photovoltaic cell is especially beneficial when using portable electronic devices, which utilize a rechargeable internal battery with a limited power life per charge.

Both configurations also include a stand that allows the device case to be maintained in an upright position during use.

In view of the above disclosure, the primary object of the invention is to provide an electronic device case that can effectively store, protect and power a portable electronic device.

In addition to the primary object of the invention it is also an object of the invention to provide an electronic device case that:

- can be utilized for a variety of portable electronic devices such as a table PC, an e-book or a laptop PC,
- can be made of various materials,
- can be made as a specific-fit case for a particular brand/model of electronic device, or can be made in a general size to accommodate multiple brands/models of electronic devices,
- can be made in various colors, with or without indicia,
- can be sold along with an electronic device as an OEM item, or can be sold as an after-market accessory,
- is easy to maintain and clean, and
- is cost effective from both a manufacturer's and consumer's point of view.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 8 is a side view of the EDC showing a U-shaped stand.

BEST MODE FOR CARRYING OUT THE INVENTION

The best mode for carrying out the invention is presented in terms that disclose a preferred embodiment of an electronic device case 10, hereinafter "EDC 10". As shown in FIGS. 1-8, the EDC 10 consists of two design configurations. Both configurations provide storage, protection and power for a portable electronic device 108 such as a tablet PC, an e-book or a laptop PC.

Figure 1:
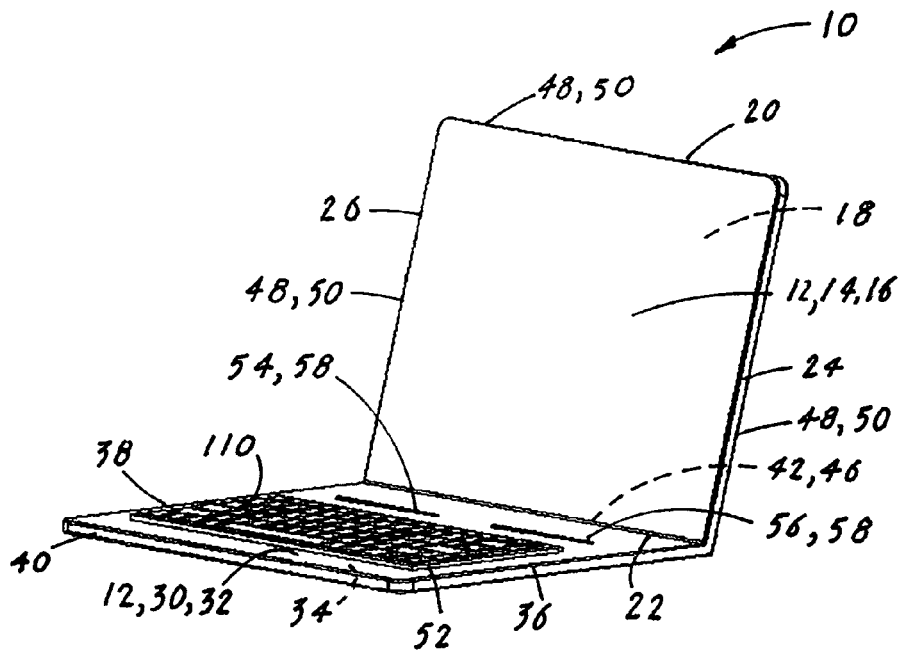
FIG. 1 is a front and side isometric view showing the first design configuration of an electronic device case (EDC).
Figure 4:
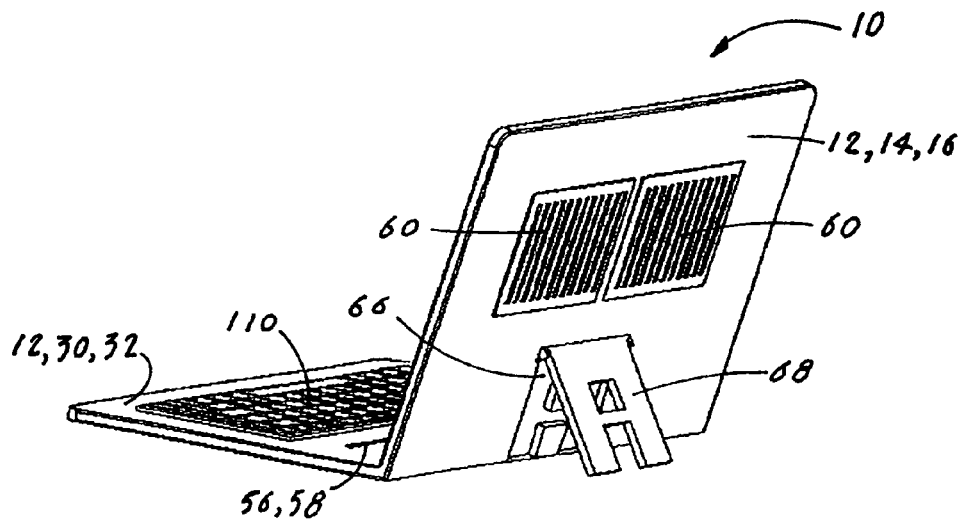
FIG. 4 is a rear and side isometric view of the EDC showing a stand and photovoltaic cells.

The first design configuration, as shown in FIGS. 1-5, is comprised of a device cover 12 having a first section 14 and a second section 30. The first section 14 comprises a front surface 16, a rear surface 18, an upper edge 20, a lower edge 22, a right edge 24 and a left edge 26. The second section 30 comprises an upper surface 32, a lower surface 34, a right edge 36, a left edge 38, a front edge 40, and a rear edge 42. As shown in FIGS. 1 and 4, the rear edge 42 of the second section 30 interfaces with and is attached to the lower edge 22 of the first section 14 to create a living hinge 46 for the two sections 14,30.

In the first design configuration, a portable electronic device 108 is inserted into the device cover 12 via an opening 48 on the upper edge 20, the right edge 24 or the left edge 26 of the first section 14. A closing means 50 such as a zipper or hook and loop fastener can be utilized to maintain the electronic device 108 securely within the cover 12.

Figure 2:
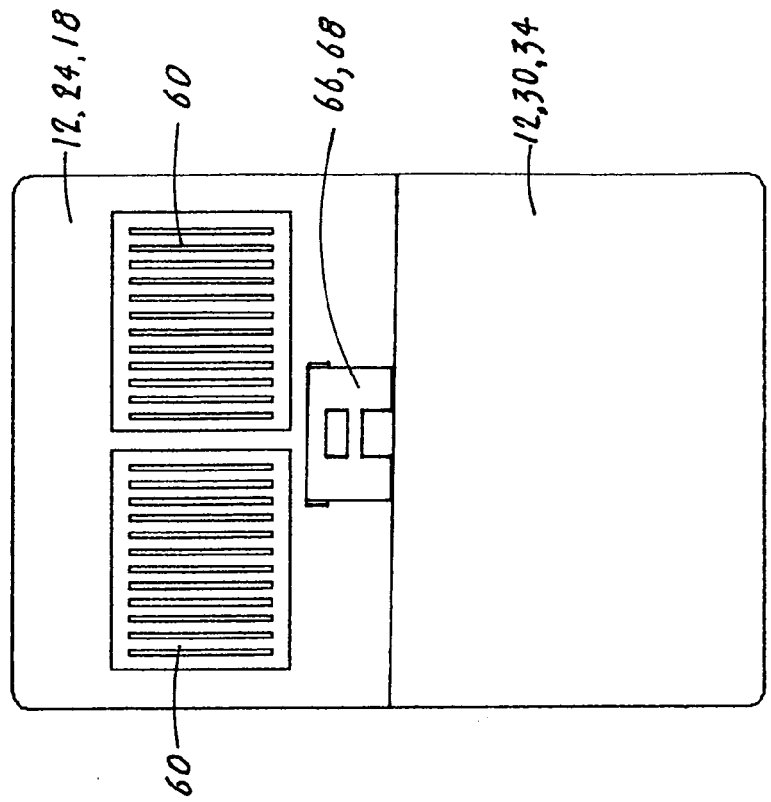
FIG. 2 is a top plan view of the EDC showing photovoltaic cells.

As shown in FIGS. 1, 2 and 4, a keyboard 110 is placed within a keyboard cavity 52 that is located on the upper surface 32 of the second section 30. As also shown in FIGS. 1 and 2, a first pocket 54 is located on the upper surface 32 of the second section 30. The first pocket 54 holds a USB cable 112 for interfacing the keyboard 110 to the electronic device 108. A second pocket 56 is also located on the upper surface 32 of the second section 30. The second pocket 56 holds a power cable 114 for supplying power to the electronic device 108. Both pockets 54,56 include closing means 58 such as a zipper, a hook and loop fastener or a snap closure.

Figure 3:
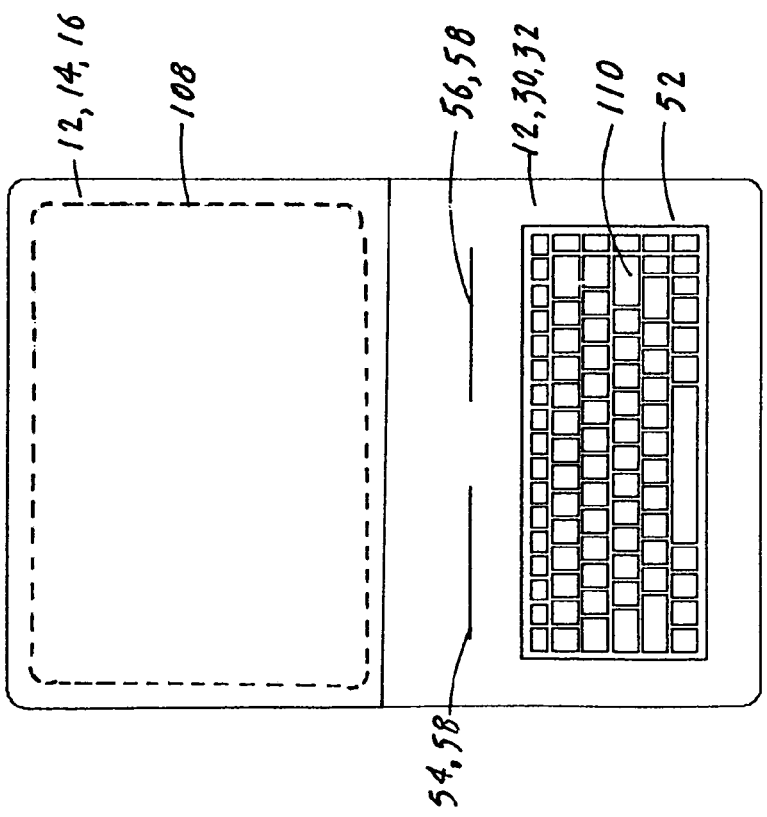
FIG. 3 is a top plan view of the EDC showing a keyboard within a keyboard cavity and two pockets.
Figure 5:
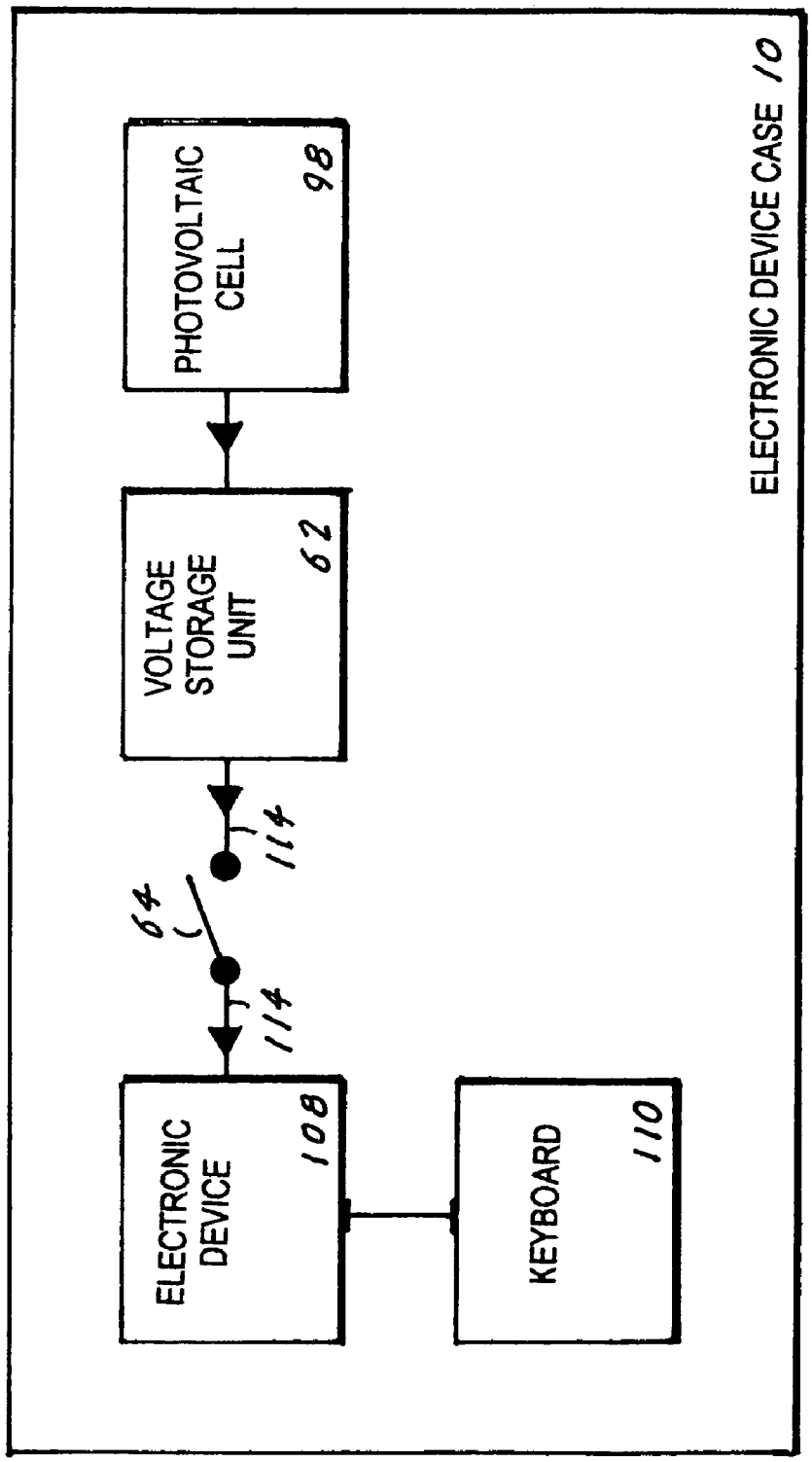
FIG. 5 is a block diagram showing the power supply elements of the EDC.

As shown in FIGS. 3 and 4, at least one photovoltaic cell 60 is located on the rear surface 18 of the first section 14. The photovoltaic cell 60 absorbs solar power that is converted into a DC voltage for powering the electronic device 108. Additionally, there is a means for supplying auxiliary power to the electronic device 108 when the device's internal battery produces a lower voltage. Preferably, the auxiliary power means is comprised of a voltage storage unit 62 that is connected between the photovoltaic cell 60 and the electronic device 108. A power switch 64, as shown in FIG. 3, is connected between the voltage storage unit 62 and the electronic device 108.

The first design configuration further comprises a stand 66 having a downward-angled hinged leg 68. As best shown in FIG. 4, the stand 66 is attached to the rear surface 18 of the first section 14 adjacent the lower edge 22. The stand 66 allows the first section 14 with an electronic device 108 therein to be maintained in an upright position, perpendicular to the second section 30 during use. When the electronic device 108 is not being used, the first section 14 is folded down onto the second section 30.

Figure 6:
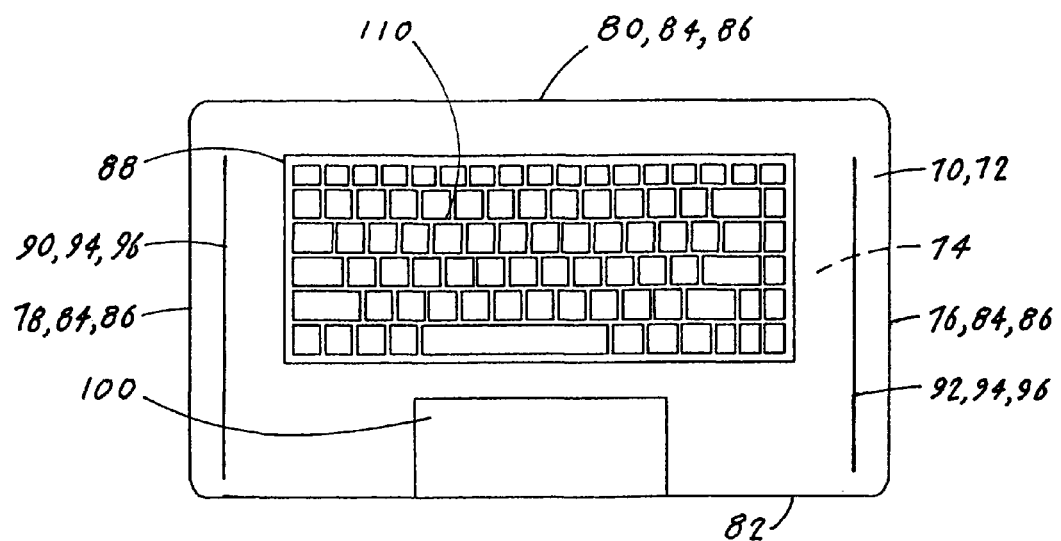
FIG. 6 is a top plan view of the second design configuration of the EDC showing a keyboard within a keyboard cavity and two pockets.
Figure 7:
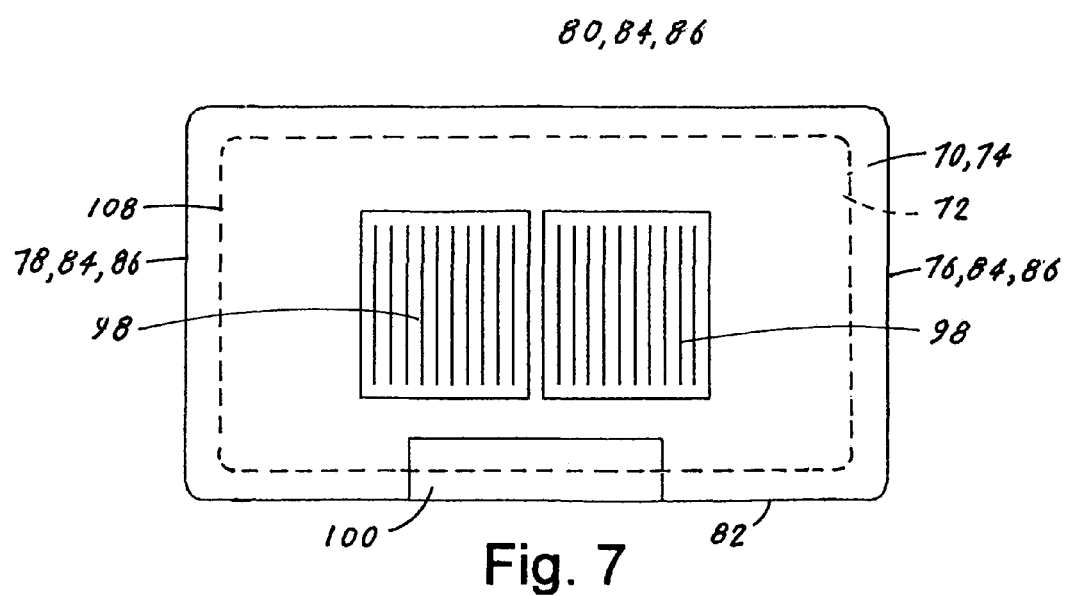
FIG. 7 is a bottom plan view of the EDC showing photovoltaic cells.

The second design configuration of the EDC 10 provides the same functionality as the first design configuration, while utilizing many of the same elements. As shown in FIGS. 6-8, the second design configuration is comprised of a single, unitary device cover 70 having an upper surface 72, a lower surface 74, a right edge 76, a left edge 78, a rear edge 80 and a front edge 82. For storage and travel the electronic device 108 is inserted into the cover 70 via an opening 84 on the right edge 76, the left edge 78 or the rear edge 80. Closing means 86 such as a zipper or a hook and loop fastener can be utilized to maintain the electronic device 108 securely with the cover 70. When the device 108 is to be used, it is removed from the cover 70.

As with the first design configuration, a keyboard 110 is placed within a keyboard cavity 88 that is located on the lower surface 74, as shown in FIG. 6. A first pocket 90 for holding a USB cable 112 is located on the lower surface 74 adjacent the right edge 76, and a second pocket 92 for holding a power cable 114 is located on the lower surface 74 adjacent to the left edge 78. Both pockets 90,92 include an opening 94 with closing means 96 such as a zipper, a hook and loop fastener or a snap closure. Although the locations of the pockets for both design configurations are disclosed, the pockets can also be placed at other locations on the device cover 12,70.

As shown in FIG. 7, at least one photovoltaic cell 98 is located on the upper surface 72. The photovoltaic cell 98 absorbs solar power that is converted into a DC voltage for powering the electronic device. The second design configuration also utilizes the same voltage storage unit and switch as the first design configuration.

As shown in FIG. 8, the second design configuration further comprises a removable U-shaped stand 100 that interfaces with the front edge 82. Attached to the rear section of the U is a leg 102 that angularly extends downward from the rear section via a living hinge. The U-shaped stand 100 allows the cover 70 with an electronic device 108 enclosed to be positioned vertically upright, with the U-shaped stand 100 located at the bottom of the upright cover 70 and the leg 102 angularly extending downward to provide vertical stability.

Both design configurations of the EDC 10 are made of a material selected from the group consisting of plastic, fabric or leather, with silicone preferred. Additionally, the material can be coated with a waterproof substance 104. Further, either design configuration can include at least one handle and/or strap that allow the EDC 10 to be easily carried or worn.

While the invention has been described in detail and pictorially shown in the accompanying drawings it is not to be limited to such details, since many changes and modifications may be made to the invention without departing from the spirit and the scope thereof. Hence, it is described to cover any and all modifications and forms which may come within the language and scope of the claims.

Electronic Device Case

Element Designation

For Convenience by the Examiner, not Part of the Specification

| | |
|---|---|
| 10 | Electronic Device Case |
| 12 | Device Cover - First Embodiment |
| 14 | First Section |
| 16 | Front Surface |
| 18 | Rear Surface |
| 20 | Upper Edge |
| 22 | Lower Edge |
| 24 | Right Edge |
| 26 | Left Edge |

-continued

| | |
|---|---|
| 28 | |
| 30 | Second Section |
| 32 | Upper Surface |
| 34 | Lower Surface |
| 36 | Right Edge |
| 38 | Left Edge |
| 40 | Front Edge |
| 42 | Rear Edge |
| 44 | |
| 46 | Living Hinge |
| 48 | Opening |
| 50 | Closing Means |
| 52 | Keyboard Cavity |
| 54 | First Pocket |
| 56 | Second Pocket |
| 58 | Closing Means (Pocket) |
| 60 | Photovoltaic Cell |
| 62 | Voltage Storage Unit |
| 64 | Switch |
| 66 | Stand |
| 68 | Leg |
| 70 | Device Cover - Second Emb. |
| 72 | Upper Surface |
| 74 | Lower Surface |
| 76 | Right Edge |
| 78 | Left Edge |
| 80 | Rear Edge |
| 82 | Front Edge |
| 84 | Opening |
| 86 | Closing Means |
| 88 | Keyboard Cavity |
| 90 | First Pocket |
| 92 | Second Pocket |
| 94 | Opening |
| 96 | Closing Means |
| 98 | Photovoltaic Cell |
| 100 | U-Shaped Stand |
| 102 | Leg |
| 104 | Waterproof Substance |
| 106 | |
| 108 | Electronic Device |
| 110 | Keyboard |
| 112 | USB Cable |
| 114 | Power Cable |

The invention claimed is:

1. An electronic device case for storing and protecting a portable electronic device including a tablet PC or e-book, wherein said case comprises:

a) a device cover having an upper surface, a lower surface, a right edge, a left edge, a rear edge and a front edge, wherein the electronic device is inserted into said cover and when the device is to be used, the device is removed from said cover, b) a keyboard that is located within a keyboard cavity on the lower surface, c) a first pocket that is located on the lower surface adjacent to the right edge, wherein the first pocket holds a USB cable for interfacing the keyboard to the electronic device, d) a second pocket that is located on the lower surface adjacent the left edge, wherein the second pocket holds a power cable for supplying power to the electronic device, e) at least one photovoltaic cell that is located on the upper surface, wherein the at least one photovoltaic cell absorbs solar power that is converted into a DC voltage for powering the electronic device, and f) a stand having a downward-angled hinged leg, wherein the stand is attached to the rear surface of said first section adjacent the lower edge, wherein the stand allows said first section with an electronic device therein to be maintained in an upright position, perpendicular to said second section during use, wherein when the electronic device is not in use said first section is folded down onto said second section.

2. The electronic device case as specified in claim 1 wherein the portable electronic device is inserted into said cover via an opening on the right edge, an opening on the left edge, or an opening on the rear edge.

3. The electronic device case as specified in claim 1 further comprising a means for supplying auxiliary power to said electronic device when the device's internal battery produces a lower voltage.

4. The electronic device case as specified in claim 1 wherein said auxiliary power means comprises a voltage storage unit that is connected between said photovoltaic cell and the electronic device.

* * * * *